(12) United States Patent
Wells et al.

(10) Patent No.: US 9,678,299 B2
(45) Date of Patent: Jun. 13, 2017

(54) FIBER STORAGE DEVICE

(71) Applicant: ADC Telecommunications, Inc., Berwyn, PA (US)

(72) Inventors: Dennis Ray Wells, Richfield, MN (US); Rodney C. Schoenfelder, Shakopee, MN (US); Cyle D. Petersen, Belle Plaine, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 14/829,015

(22) Filed: Aug. 18, 2015

(65) Prior Publication Data
US 2016/0046460 A1    Feb. 18, 2016

Related U.S. Application Data

(60) Provisional application No. 62/038,547, filed on Aug. 18, 2014.

(51) Int. Cl.
  *G02B 6/44* (2006.01)
  *B65H 75/08* (2006.01)
  *B65H 75/28* (2006.01)
  *B65H 75/44* (2006.01)

(52) U.S. Cl.
  CPC ........... *G02B 6/4471* (2013.01); *B65H 75/08* (2013.01); *B65H 75/285* (2013.01); *B65H 75/4473* (2013.01); *B65H 2701/32* (2013.01)

(58) Field of Classification Search
  None
  See application file for complete search history.

(56) References Cited

U.S. PATENT DOCUMENTS

| | | | |
|---|---|---|---|
| 5,702,066 A * | 12/1997 | Hurst | G02B 6/4457 242/170 |
| 6,481,662 B1 * | 11/2002 | Kles | B65H 54/58 242/400.1 |
| 6,539,161 B2 | 3/2003 | Holman et al. | |
| 6,612,515 B1 * | 9/2003 | Tinucci | B65H 49/38 206/397 |

(Continued)

FOREIGN PATENT DOCUMENTS

| EP | 2 680 055 A1 | 1/2014 |
|---|---|---|
| JP | 2001-311833 | 11/2001 |

(Continued)

OTHER PUBLICATIONS

International Search Report and Written Opinion for Application No. PCT/US2015/045389 mailed Oct. 30, 2015.

*Primary Examiner* — Ryan Lepisto
(74) *Attorney, Agent, or Firm* — Merchant & Gould P.C.

(57) ABSTRACT

An example fiber storage device includes a bend radius limiter extending along a height from a first end to a second end. The first end is seated at a mounting surface. One or more arms extend outwardly from the second end of the body. Each of the arms defines a retaining member that contacts the mounting surface. Each retaining member has a first contact surface that faces away from the storage surface and a second contact surface that faces towards the storage surface. A storage region is defined between the mounting surface, the storage surface, one of the arms arm, and the second contact surface of the respective retaining member.

20 Claims, 5 Drawing Sheets

(56) References Cited

U.S. PATENT DOCUMENTS

| | | |
|---|---|---|
| 6,643,444 B1 | 11/2003 | Putnam |
| 6,665,484 B2 | 12/2003 | Douglas et al. |
| 6,768,858 B2 | 7/2004 | Tinucci et al. |
| 6,771,871 B2 | 8/2004 | Krampotich et al. |
| 6,892,020 B2 | 5/2005 | Douglas et al. |
| 6,947,654 B2 | 9/2005 | Krampotich et al. |
| 7,097,473 B2 | 8/2006 | Krampotich et al. |
| 7,346,252 B2 | 3/2008 | Krampotich et al. |
| 8,805,153 B2 | 8/2014 | Rudenick et al. |
| 9,348,105 B2 | 5/2016 | Rudenick et al. |
| 9,360,648 B2 | 6/2016 | Rudenick et al. |
| 2005/0213919 A1 | 9/2005 | Minegishi |
| 2014/0334793 A1 | 11/2014 | Rudenick et al. |
| 2015/0168663 A1 | 6/2015 | Aznag et al. |

FOREIGN PATENT DOCUMENTS

| | | |
|---|---|---|
| JP | 2005-338535 | 12/2005 |
| WO | WO 2013/131788 A2 | 9/2013 |

\* cited by examiner

FIBER STORAGE DEVICE

CROSS REFERENCE TO RELATED APPLICATION

This application claims the benefit of U.S. Provisional Application No. 62/038,547, filed Aug. 18, 2014, and titled "Fiber Storage Device," the disclosure of which is hereby incorporated herein by reference.

BACKGROUND

Spools, reels, cassettes, and cartridges can be used to store telecommunications cable (e.g., electrical cable and/or fiber optic cable). The spools include a hub or a drum about which the cable is wound. By winding up the cable on the spool, the cable can be compactly stored and transported, protected from tangling and kinking, and kept ready for easy deployment. When optical fiber cable or optical fibers are stored, the drum of the spool is sized to inhibit excessive bending of the optical fibers.

Improvements are desired.

SUMMARY

In accordance with some aspects of the disclosure, an example fiber storage device includes a storage body extending along a height from a first end to a second end, an arm extending outwardly from the second end of the storage body to a distal end of the arm, and a retaining member disposed at the distal end of the arm. The first end of the storage body is configured to couple to a mounting surface. At least a portion of the storage body defines a storage surface that extends between the first and second ends. The storage surface is contoured to limit a bending radius of any fiber extending along the storage surface. The arm is sufficiently flexible to enable the distal end of the arm to deflect along the height of the storage body. The retaining member having a first contact surface that faces away from the storage surface of the storage body and a second contact surface that faces towards the storage surface of the storage body, the first contact surface being free of sharp edges.

In certain implementations, the retaining member defines a third contact surface that faces away from the second end of the storage body. The third contact surface is configured to contact the mounting surface when the first end of the storage body is coupled to the mounting surface and no external bias is being applied to the arm.

In certain implementations, an alignment peg extends outwardly from the first end of the storage body parallel with the height of the storage body.

In certain implementations, the retaining member is integrally formed with the arm. In examples, the arm is integrally formed with the storage body.

In certain implementations, the arm has a transverse cross-sectional profile free of sharp angles. In examples, the retaining member is enlarged relative to the transverse cross-sectional profile of the arm.

In some implementations, the storage surface of the storage body includes an annular surface. In other implementations, the storage surface of the storage body includes an arced surface that forms less than a full circle.

In certain implementations, a second arm extends outwardly from the second end of the storage body to a distal end of the second arm. The second arm is sufficiently flexible to enable the distal end of the second arm to deflect along the height of the storage body. The second arm has an external perimeter free of sharp angles. A second retaining member is disposed at the distal end of the second arm. The second retaining member is enlarged relative to the second arm. The second retaining member has a first contact surface that faces away from the storage surface of the storage body and a second contact surface that faces towards the storage surface of the storage body.

In certain examples, four arms extend outwardly from the storage body including the first and second arms. In an example, a respective retaining member is disposed at the distal end of each arm.

In accordance with other aspects of the disclosure, an example method of storing optical fibers includes providing a fiber storage device at a mounting surface at which an optical fiber is to be stored. The fiber storage device includes a bend radius limiter and at least one arm extending outwardly from the bend radius limiter. The arm has an enlarged distal end defining a retaining member. The method of storing optical fibers also includes sliding an optical fiber towards a first contact surface of the retaining member; applying pressure to the first contact surface with the optical fiber to deflect the retaining member away from the mounting surface; and sliding the optical fiber past the retaining member towards the bend radius limiter, thereby allowing the retaining member to deflect back towards the mounting surface so that the optical fiber is held in a storage space between the bend radius limiter and the retaining member. The first contact surface is contoured so that no sharp edges contact the optical fiber while pressure is being applied.

In certain implementations, the method of storing optical fibers also includes sliding a plurality of optical fibers towards the first contact surface of the retaining member; applying pressure to the first contact surface with the plurality of optical fibers to deflect the retaining member away from the mounting surface; and sliding the optical fibers past the retaining member towards the bend radius limiter, thereby allowing the retaining member to deflect back towards the mounting surface so that the optical fibers are held in a storage space between the bend radius limiter and the retaining member. The first contact surface is contoured so that no sharp edges contact the plurality of optical fibers while pressure is being applied.

In certain implementations, the fiber storage device includes a plurality of arms including the at least one arm. At least some of the arms have a respective enlarged distal end that defines a respective retaining member. In examples, the method of storing optical fibers also includes sliding the optical fiber towards a respective first contact surface of each retaining member; applying pressure to the first contact surfaces with the optical fiber to deflect the retaining members away from the mounting surface; and sliding the optical fibers past the retaining members towards the bend radius limiter, thereby allowing the retaining members to deflect back towards the mounting surface so that the optical fiber is held in a storage space between the bend radius limiter and the retaining members. The first contact surfaces are contoured so that no sharp edges contact the optical fiber while pressure is being applied.

In certain implementations, the optical fiber(s) are removed from the fiber storage device by sliding the optical fiber away from the bend radius limiter and towards a second contact surface of the retaining member; applying pressure to the second contact surface with the optical fiber to deflect the retaining member away from the mounting surface; and sliding the optical fiber past the retaining member away from the bend radius limiter and out of the storage region, thereby allowing the retaining member to deflect back towards the mounting surface. The second contact surface is contoured so that no sharp edges contact the optical fiber while pressure is being applied.

In certain implementations, the fiber storage device is mounted to the mounting surface by aligning an alignment peg at a first end of the bend radius limiter with an opening defined in the mounting surface; inserting the alignment peg into the opening; and securing the bend radius limiter to the mounting surface using a fastener. In an example, the fastener is inserted through the mounting surface and threaded the fastener upwardly through the first end of the bend radius limiter.

In accordance with other aspects of the disclosure, an example fiber storage system includes a mounting surface at which the optical fibers are to be stored; and a fiber storage device secured to the mounting surface. The fiber storage device includes a storage body extending along a height from a first end to a second end and a plurality of arms extending outwardly from the second end of the storage body to distal ends. The first end of the storage body is seated at the mounting surface. At least a portion of the storage body defines a storage surface that extends between the first and second ends. The storage surface is contoured to limit a bending radius of any fiber extending along the storage surface. Each of the arms defines a retaining member at the respective distal end. Each retaining member has a first contact surface that faces away from the storage surface, a second contact surface that faces towards the storage surface, and a third contact surface that contacts the mounting surface so that a storage region is defined between the mounting surface, the storage surface, the arm, and the second contact surface of the retaining member.

In certain implementations, the mounting surface defines alignment openings and wherein the fiber storage device includes alignment pegs configured to extend into the alignment openings when the storage body is seated at the mounting surface.

In certain implementations, a fastener extends upwardly through the mounting surface and into the first end of the storage body. The fastener does not extend through the second end of the storage body.

In certain implementations, the bend radius limiter defines a spool drum.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
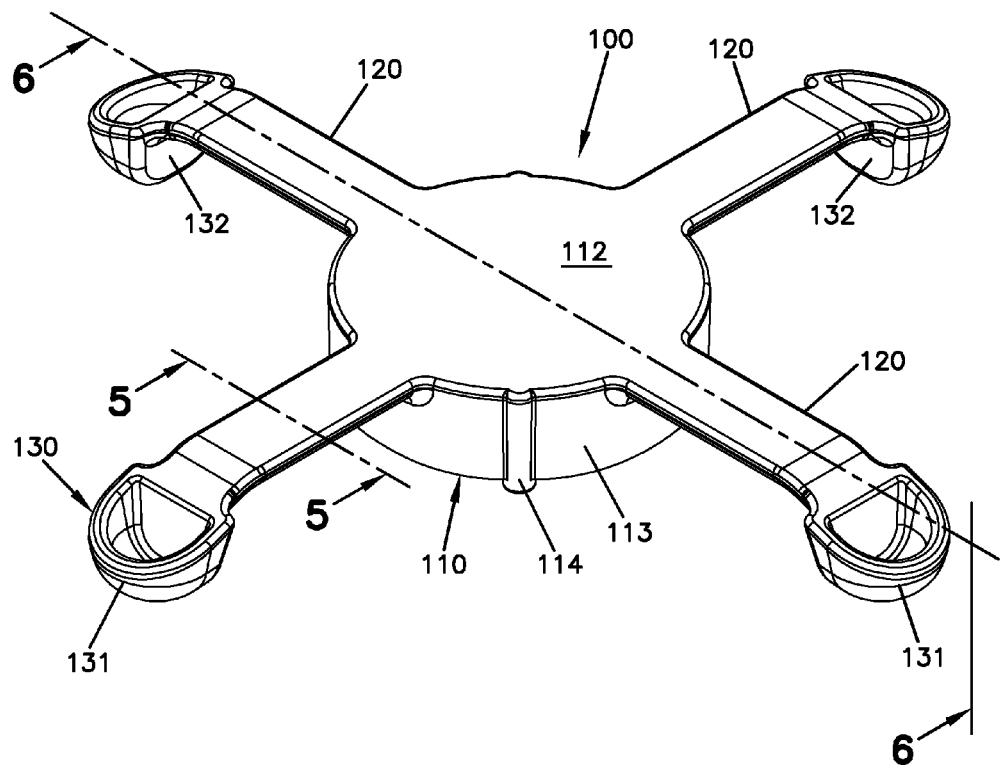
FIG. 1 is a top perspective view of an example fiber storage device.

Reference will now be made in detail to exemplary aspects of the present disclosure that are illustrated in the accompanying drawings. Wherever possible, the same reference numbers will be used throughout the drawings to refer to the same or like parts.

The present disclosure relates generally to a fiber storage device at which one or more optical fibers can be stored. The fiber storage device does not include sharp edges at any surface against which the optical fiber can pull. The fiber storage device retains the fibers within one or more storage regions defined by deflectable retaining members of the fiber storage device.

Referring generally to the figures, one example fiber storage device 100 includes a storage body 110 and at least one arm 120. The storage body 110 extends along a height $H_1$ (FIG. 2) from a first end 111 to a second end 112. At least a portion of the storage body 110 defines a storage surface 113 that extends between the first and second ends 111, 112. The storage surface 113 is contoured to limit a bending radius of any fiber extending along the storage surface 113 (i.e., forms a bend radius limiter).

In the example shown in FIG. 1, the storage surface 113 is a generally annular surface around an exterior of the storage body 110. In some examples, the storage surface 113 defines a constant curvature. In other examples, however, protrusions and/or depressions can interrupt the storage surface 113 (e.g., see the alignment peg 114 of FIG. 1). In other examples, the storage surface 113 can define less than a full circle (e.g., can form an arc). In still other examples, the storage surface 113 can be a generally oblong surface or other irregularly contoured surface.

In some implementations, the first end 111 of the storage body 110 is configured to couple to a mounting surface 150 (e.g., a panel, a wall, a drawer, a chassis base, a blade, etc.). In some implementations, the storage body 110 may define a fastener hole 115 accessible through the first end 111 (e.g., see FIGS. 4 and 5). In such implementations, the mounting surface 150 defines one or more fastener openings 155. In certain implementations, one or more alignment pegs 114 extend from the storage body 110 beyond the first end 111. In such implementations, the mounting surface 150 defines one or more alignment holes 154 adjacent the one or more fastener openings 115.

In some implementations, the alignment peg(s) 114 of the storage device 100 align with the alignment holes 154 when the fastener hole 115 of the storage device 100 aligns with the fastener opening 115. In certain examples, the mounting surface 150 has more alignment holes 154 around each fastener opening 155 than the storage body 110 has alignment pegs 114. In such examples, the storage device 100 can be oriented in one of multiple rotational positions on the mounting surface 150.

Figure 7:
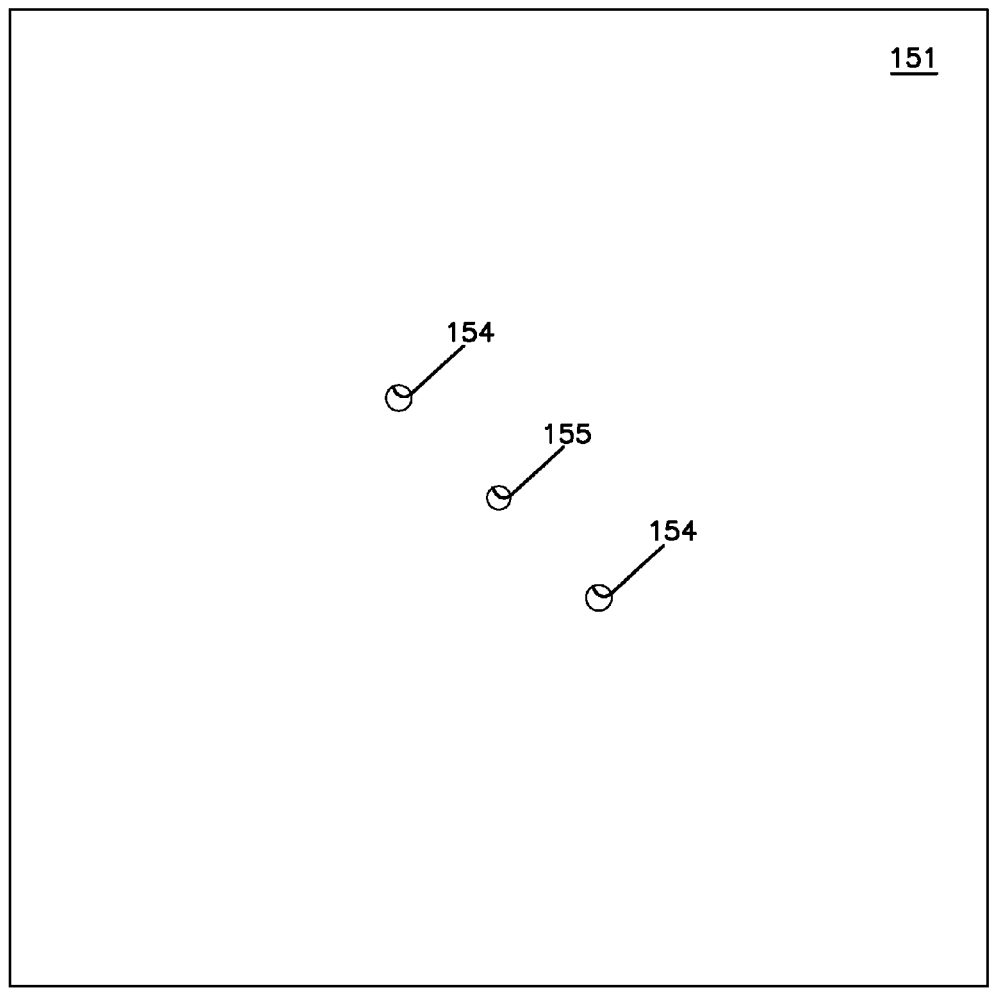
FIG. 7 is a bottom plan view of the mounting surface of FIG. 3.

During installation, a user mounts the fiber storage device 100 to the mounting surface 150 by aligning each alignment peg 114 at a first end 111 of the storage body 110 with a corresponding alignment opening 154 defined in the mounting surface 150; inserting each alignment peg 114 into the corresponding opening 154; and securing the storage body 110 to the mounting surface 150 using a fastener. In certain implementations, the user inserts the fastener through the fastener opening 155 from a bottom 151 (FIG. 7) of the mounting surface 150 and threads the fastener upwardly through the first end 111 of the storage body 110 (e.g., through the fastener hole 115).

Figure 2:
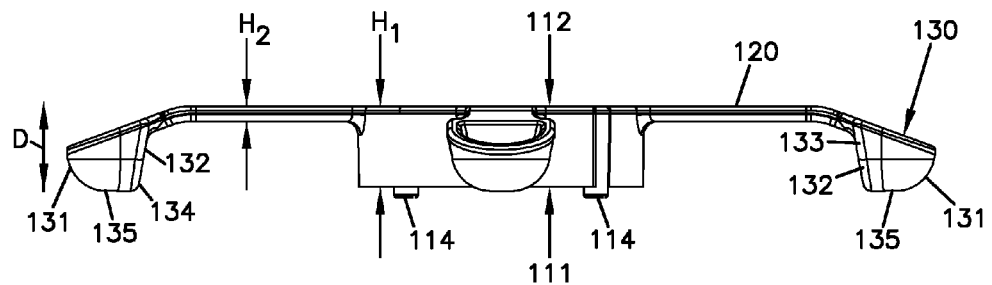
FIG. 2 is a side elevational view of the fiber storage device of FIG. 1.
Figure 3:
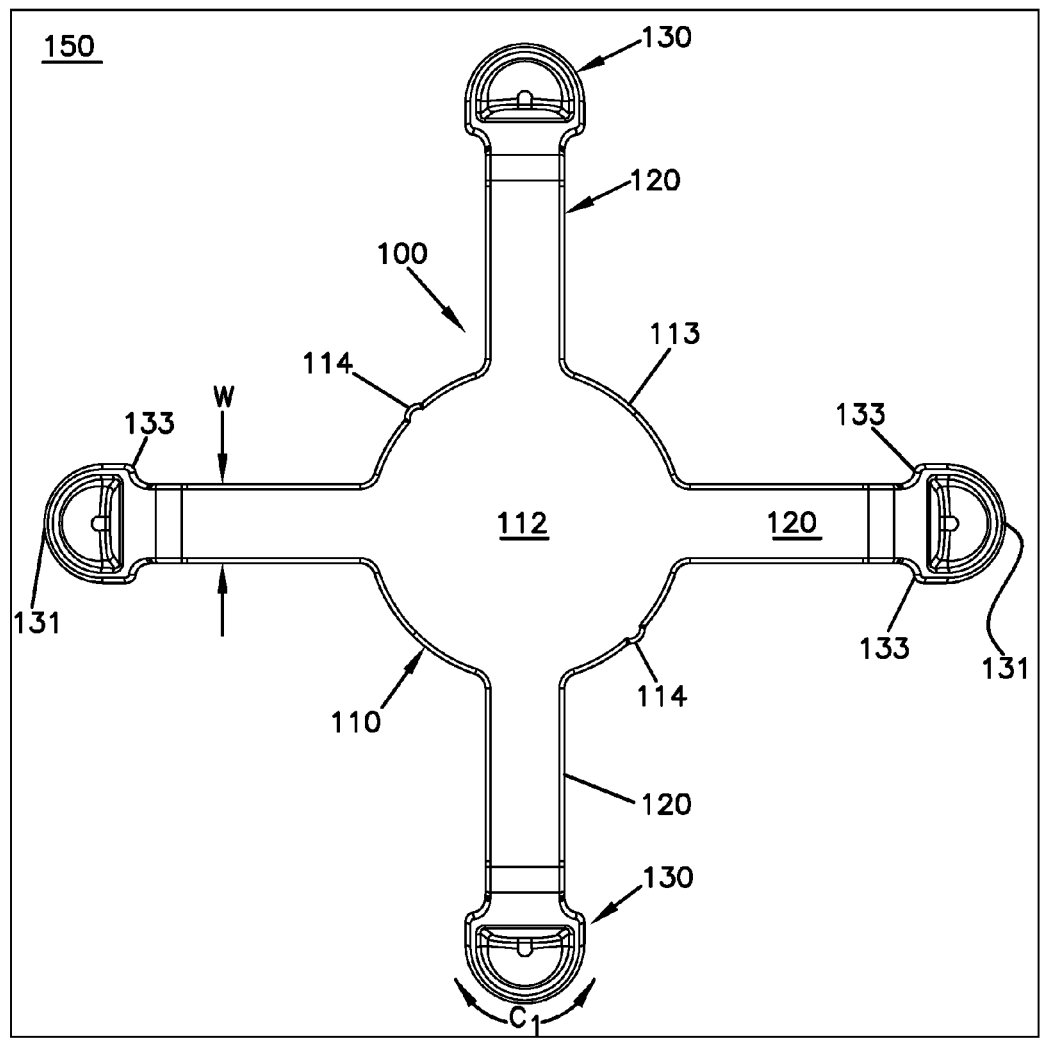
FIG. 3 is a top plan view of the fiber storage device of FIG. 1 disposed on a mounting surface.

The arm 120 extends radially outwardly from the second end 112 of the storage body 110. The arm 120 has a height $H_2$ (FIG. 2) and a width W (FIG. 3). The arm 120 is sufficiently flexible to enable a distal end of the arm 120 to deflect along an axis D (FIG. 2). In certain examples, the axis D is parallel to the height $H_1$ of the storage body 110.

Figure 5:
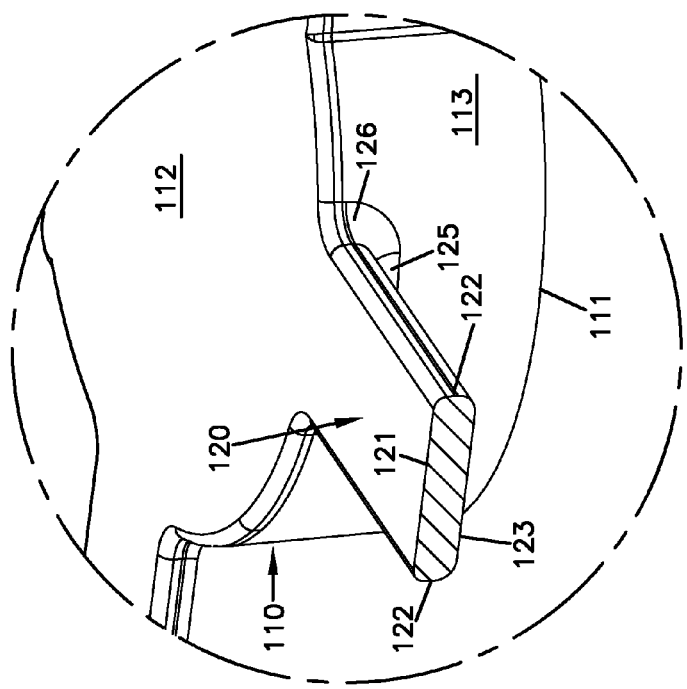
FIG. 5 shows a transverse cross-sectional view of an arm of the storage device of FIG. 1 taken along the 5-5 line of FIG. 1.

As shown in FIG. 5, a transverse cross-sectional profile of the arm 120 is contoured to inhibit damage to any optical fiber pulled against the arm 120. For example, the transverse cross-sectional profile of the arm 120 can include a top surface 121, a bottom surface 123, and rounded sides 122 that extend therebetween. An optical fiber pulled tight against the arm 120 would not encounter the rounded sides 122 instead of sharp edges. In examples, the top and bottom surfaces 121, 123 can be generally flat. In other examples, the top and bottom surfaces 121, 123 can be contoured. In some implementations, the arm 120 defines a contoured transition surface 125 between the bottom surface 123 of the arm 120 and the storage surface 113 (see FIG. 5). In an example, the transition surface 125 defines a concave contour.

A retaining member 130 is disposed at a distal end of the arm 120. The retaining member 130 is deflectable along the axis D when the arm 120 is flexed. The retaining member 130 is enlarged relative to the transverse cross-sectional profile of the arm 120. The retaining member 130 has a first contact surface 131 that faces away from the storage surface 113 of the storage body 110. The retaining member 130 also has a second contact surface 132 that faces towards the storage surface 113 of the storage body 110.

Figure 6:
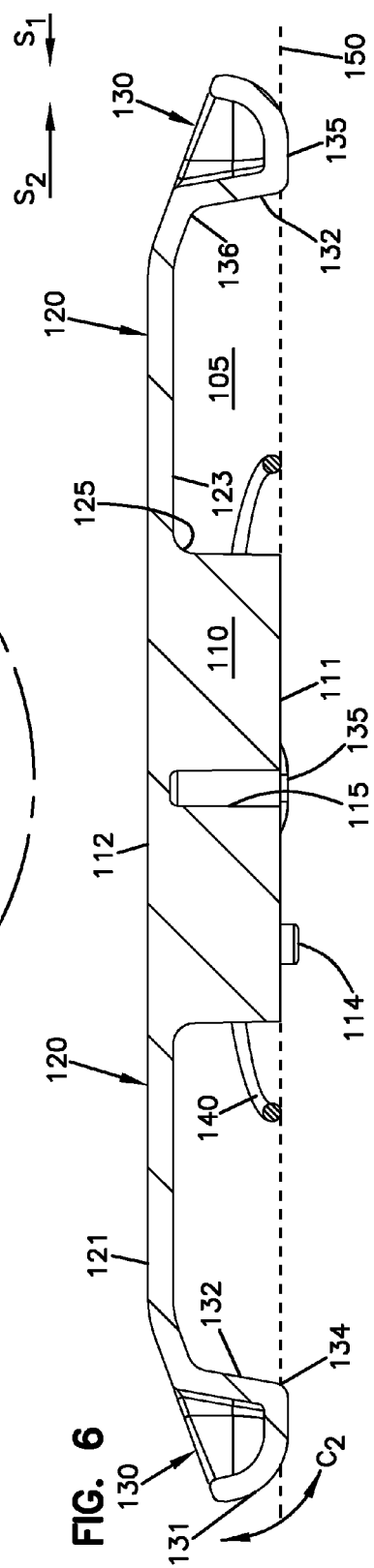
FIG. 6 is a cross-sectional view of the storage device of FIG. 1 taken along the 6-6 line of FIG. 1.

In some implementations, the first contact surface 131 is free of sharp edges. In certain implementations, the first contact surface 131 defines a convex contour along an arc $C_1$ (FIG. 4) that curves towards the storage body 110. In certain implementations, the first contact surface 131 defines a convex contour along an arc $C_2$ (FIG. 6) that curves partially along the height H of the storage body 110. In certain examples, the arc $C_1$ is defined in a first plane and the arc $C_2$ is defined in a second plane that is orthogonal to the first plane. In certain examples, the first contact surface 131 has a partial bowl shape.

Figure 4:
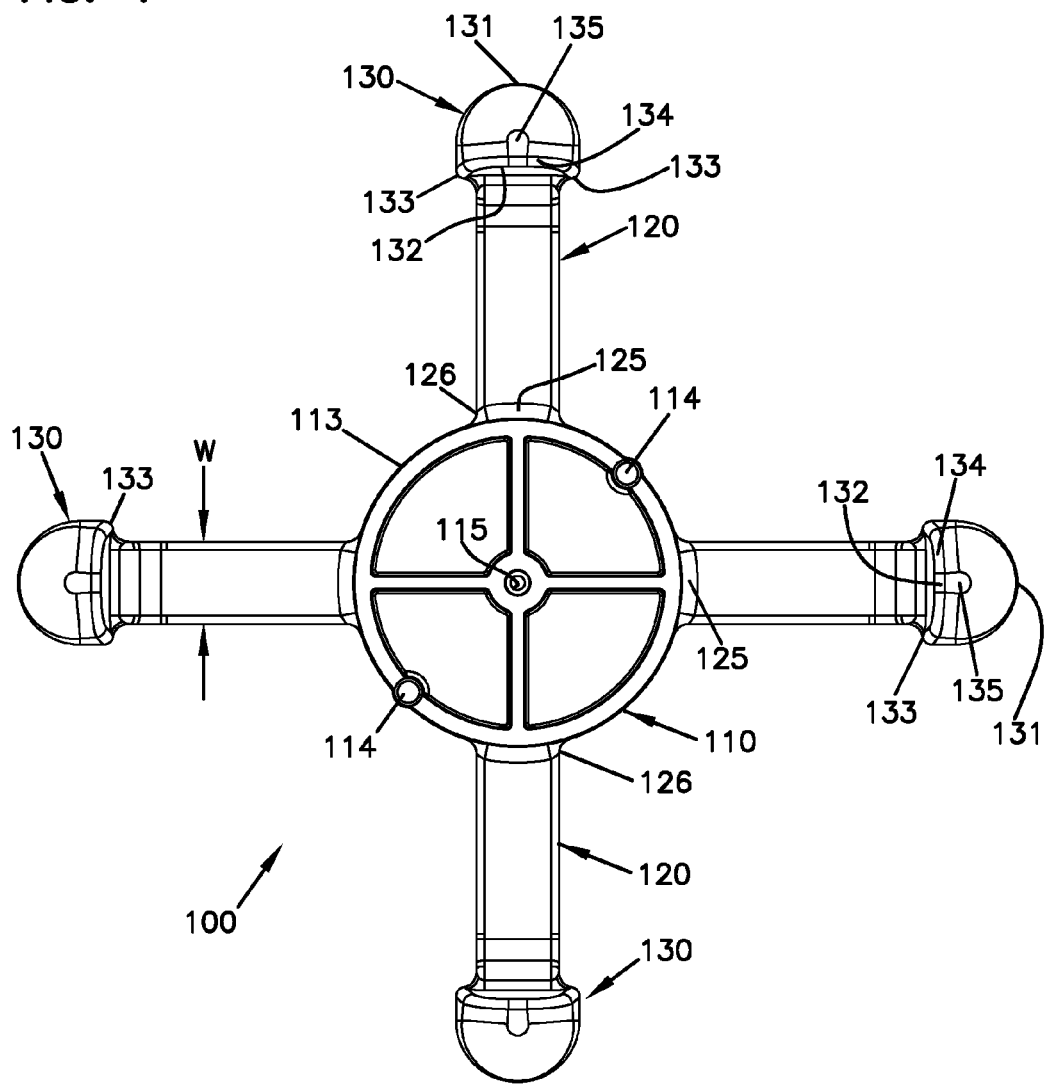
FIG. 4 is a bottom plan view of the fiber storage device of FIG. 1.

In certain implementations, the second contact surface 132 is less curved than the first contact surface 131. In the example shown, the second contact surface 132 defines a concave curvature as the second contact surface 132 extends along a width W of the respective arm 120 (FIG. 4). In other examples, the second contact surface 132 can define a convex curvature as the second contact surface 132 extends along a width W of the respective arm 120. In still other examples, the second contact surface 132 can be generally flat as the second contact surface 132 extends along a width W of the respective arm 120.

In some implementations, the second contact surface 132 is free of shape edges. For example, sides 133 of the second contact surface 132 may define a convex curvature that transitions to the first contact surface 131 (see FIG. 4). An optical fiber pulled against the second contact surface 132 would wrap around the contoured sides 133 without encountering a sharp edge that would damage the fiber. In some implementations, a bottom 134 of the second contact surface 132 may define a convex curvature that transitions to a bottom surface 135 (see FIG. 6). An optical fiber pulled against the second contact surface 132 would wrap around the contoured sides 133 without encountering a sharp edge that would damage the fiber.

In accordance with some aspects of the disclosure, the retaining member 130 defines a bottom surface 135 that is configured to face the mounting surface 150 when the storage body 110 is mounted to the mounting surface 150. In certain examples, the bottom surface 135 of the retaining member 130 contacts the mounting surface 150 when the storage body 110 is mounted to the mounting surface 150 and when no external bias is being applied to the respective arm 120.

A storage region 105 is defined by the storage body 110, the arm 120, the retaining member 130, and the mounting surface 150. For example, the storage region 105 may extend between the storage surface 113 and the second contact surface 132. In certain examples, the storage region 105 also extends between the mounting surface 150 and the bottom surface 123 of the arm 120.

In use, a user can insert one or more optical fibers 140 into the storage region 105 by moving (e.g., sliding) the optical fiber(s) in a first direction $S_1$ against the first contact surface 131 of the retaining member 130. The user applies pressure to the first contact surface 131 with the optical fiber(s) 140 to deflect the retaining member 130 away from the mounting surface 150. For example, applying pressure to the first contact surface 131 in the first direction $S_1$ biases the retaining member 130 along the deflection axis D away from the mounting surface 150. The optical fiber(s) 140 does not encounter any sharp edges while pressure is being applied.

The user continues to move the optical fiber(s) past the retaining member 130 towards the storage surface 113. For example, the optical fiber(s) 140 slide along the contoured surface of the first contact surface 131 until reaching the bottom surface 135. The user moves (e.g., slides) the optical fiber(s) 140 between the bottom surface 135 of the retaining member 130 and the mounting surface 150. The retaining member 130 deflects back towards the mounting surface 150 when the optical fiber(s) 140 clears the bottom surface 135 of the retaining member 130. The storage space 105 holds the optical fiber(s) 140 between the storage surface 113 and the retaining member 130 (e.g., see FIG. 6).

Continuing to move the optical fiber(s) 140 along the first direction S1 will cause the optical fiber(s) 140 to contact the storage surface 113, which provides bend radius protection for the optical fiber(s) 140. The optical fiber(s) 140 will encounter the bottom surface 123 of the arm 120 if the optical fiber(s) 140 is moved away from the mounting surface 150. Moving the optical fiber(s) 140 against the bottom surface of the arm 120 will cause the optical fiber(s) 140 to curve around the rounded sides 122 of the arm 120, thereby inhibiting damage to the optical fiber(s). Moving the optical fiber(s) 140 against the transition surface 125 between the arm 120 and the storage surface 113 causes the optical fiber(s) to curve around the transition surface 125, thereby inhibiting damage to the optical fiber(s) 140.

To remove the optical fiber(s) 140 from the storage region 105, a user moves (e.g., slides) the optical fiber(s) 140 along a second direction $S_2$ away from the storage surface 113 and towards the retaining member 130. The user applies pressure to the second contact surface 132 with the optical fiber(s) 140 to deflect the retaining member 130 away from the mounting surface 130. In an example, the user applies pressure to the contoured sides 133 of the second contact surface 132. In another example, the user applies pressure across the second contact surface 132.

Applying pressure against the second contact surface 132 in the second direction $S_2$ with the optical fiber(s) 140 causes the optical fiber(s) 140 to cam along the second contact surface 132 towards the bottom surface 135. For example, the optical fiber(s) 140 may cam along the contoured sides 133 of the second contact surface 132 and over the bottom 134 of the second contact surface 132. The second contact surface 132 is contoured so that no sharp edges contact the optical fiber(s) 140 while pressure is being applied.

The user continues to move the optical fiber(s) 140 away the storage surface 113 past the retaining member 130 (e.g., between the bottom surface 135 and the mounting surface 150). The retaining member 130 deflects back towards the mounting surface 150 when the optical fiber(s) 140 clear the bottom surface 135 of the retaining member 130. The bottom 134 of the second contact surface 132 and the bottom surface 135 are free of sharp edges.

In some implementations, the first contact surface 131 and the second contact surface 132 are contoured differently so that the retaining member 130 deflects more easily when fiber(s) 140 are entering the storage region 105 than when fiber(s) 140 are leaving the storage region 105. For example, the first contact surface 131 is contoured so that the retaining member 130 will deflect away from the mounting surface 150 when a first force is applied to the first contact surface 131; the second contact surface 132 is contoured so that the retaining member 130 will deflect away from the mounting surface 150 when a second force is applied to the second contact surface 132, the second force being greater than the first force. In an example, the first contact surface 131 transitions to the bottom surface 135 more gradually than the second contact surface 132 transitions to the bottom surface 135 (e.g., see FIG. 6).

In the example shown in the figures, four arms 120 extend radially outwardly from the second end 112 of the storage body 110. In other examples, however, a greater or lesser number of arms 120 can extend from the storage body 110. In an example, two arms 120 may extend from the storage body 110. In another example three arms 120 can extend from the storage body 110. In another example, six arms can extend from the storage body 110. In the example shown, the arms 120 are spaced at regular intervals around the storage body 110. In other examples, however, the arms 120 can be spaced at irregular intervals.

In the example shown in the figures, a retaining member 130 is disposed at the distal end of each arm 120. In other examples, however, the retaining member 130 can be disposed at the distal end of less than all of the arms 120. In an example, four arms 120 may extend radially outwardly from the storage body 110 and retaining members 130 can be disposed on two of the arms 120. In examples, the retaining members 130 are identical.

In use, a user moves one or more optical fiber(s) 140 towards a respective first contact surface 131 of each retaining member 130. The user applies pressure to the first contact surfaces 131 with the optical fiber(s) 140 to deflect the retaining members 130 away from the mounting surface 150. The user continues to move the optical fiber(s) 140 past each the retaining members 130 as described above, thereby allowing the retaining members 130 to deflect back towards the mounting surface 150 so that the optical fiber(s) 140 is held in a storage spaces 105 between the storage surface 113 and the retaining members 130.

In examples, the user moves the optical fiber(s) 140 against and past each of the retaining members 130 sequentially as the user wraps the optical fiber around the storage body 110. In an example, the user wraps the optical fiber(s) 140 against the storage surface 113 of the storage body 110. In another example, the user positions the optical fiber(s) 140 within the storage region(s) 105 without causing contact between the optical fiber(s) 140 and the storage surface 113 (e.g., wraps the optical fiber(s) 140 loosely around the storage body 110).

In certain implementations, the retaining members 130 can be monolithically formed with the arms 120. In certain implementations, the arms 120 can be monolithically formed with the storage body 110. In certain implementations, all portions of the fiber storage device 100 are monolithically formed. In an example, the fiber storage device 100 can be injection molded. In other implementations, the retaining members 130 can be coupled to distal ends of the arms 120 and/or the arms 120 can be coupled to the second end 112 of the storage body 110.

The above specification, examples and data provide a complete description of the manufacture and use of the structure of the invention. Since many embodiments of the invention can be made without departing from the spirit and scope of the invention, the invention resides in the claims hereinafter appended.

What is claimed is:

1. A fiber storage device comprising:
    a storage body extending along a height from a first end to a second end, the first end being configured to couple to a mounting surface, at least a portion of the storage body defining a storage surface that extends between the first and second ends, the storage surface being contoured to limit a bending radius of any fiber extending along the storage surface;
    an arm extending outwardly from the second end of the storage body to a distal end of the arm, the arm being sufficiently flexible to enable the distal end of the arm to deflect along the height of the storage body; and
    a retaining member disposed at the distal end of the arm, the retaining member having a first contact surface that faces away from the storage surface of the storage body and a second contact surface that faces towards the storage surface of the storage body, the first contact surface being free of sharp edges as the first contact surface transitions to a third contact surface that faces away from the second end of the storage body, the first contact surface transitioning to the third contact surface more gradually than the second contact surface transitions to the third contact surface.

2. The fiber storage device of claim 1, wherein the third contact surface is configured to contact the mounting surface when the first end of the storage body is coupled to the mounting surface and no external bias is being applied to the arm.

3. The fiber storage device of claim 1, further comprising an alignment peg extending outwardly from the first end of the storage body parallel with the height of the storage body.

4. The fiber storage device of claim 1, further comprising:
    a second arm extending outwardly from the second end of the storage body to a distal end of the second arm, the second arm being sufficiently flexible to enable the distal end of the second arm to deflect along the height of the storage body, the second arm having an external perimeter free of sharp angles;
    a second retaining member disposed at the distal end of the second arm, the second retaining member being enlarged relative to the second arm, the second retaining member having a first contact surface that faces away from the storage surface of the storage body and a second contact surface that faces towards the storage surface of the storage body.

5. The fiber storage device of claim 4, wherein four arms extend outwardly from the storage body including the first and second arms.

6. The fiber storage device of claim 5, wherein a respective retaining member is disposed at the distal end of each arm.

7. The fiber storage device of claim 1, wherein the retaining member is integrally formed with the arm.

8. The fiber storage device of claim 7, wherein the arm is integrally formed with the storage body.

9. The fiber storage device of claim 1, wherein the arm has a transverse cross-sectional profile free of sharp angles.

10. The fiber storage device of claim 9, wherein the retaining member is enlarged relative to the transverse cross-sectional profile of the arm.

11. The fiber storage device of claim 1, wherein the storage surface of the storage body includes an annular surface.

12. The fiber storage device of claim 1, wherein the storage surface of the storage body includes an arced surface that forms less than a full circle.

13. The fiber storage device of claim 1, wherein the first contact surface defines a convex contour along an arc that curves towards the storage body.

14. The fiber storage device of claim 1, wherein the first contact surface defines a convex contour along an arc that curves partially along the height of the storage body.

15. The fiber storage device of claim 1, wherein the first contact surface has a partial bowl shape.

16. The fiber storage device of claim 1, wherein the first contact surface is free of any sharp edges.

17. A system for storing optical fibers, the system comprising:
   a mounting surface at which the optical fibers are to be stored;
   a fiber storage device secured to the mounting surface, the fiber storage device including:
      a storage body extending along a height from a first end to a second end, the first end being seated at the mounting surface, at least a portion of the storage body defining a storage surface that extends between the first and second ends, the storage surface being contoured to limit a bending radius of any fiber extending along the storage surface; and
      a plurality of arms extending outwardly from the second end of the storage body to distal ends, each of the arms defining a retaining member at the respective distal end, each retaining member having a first contact surface that faces away from the storage surface, a second contact surface that faces towards the storage surface, sides extending along convex curvatures between the first and second contact surfaces, and a third contact surface that contacts the mounting surface so that a storage region is defined between the mounting surface, the storage surface, the arm, and the second contact surface of the retaining member, the first contact surface transitioning to the third contact surface along a convex curve, the sides transitioning to the first contact surface more gradually than to the second contact surface.

18. The system of claim 17, wherein the mounting surface defines alignment openings and wherein the fiber storage device includes alignment pegs configured to extend into the alignment openings when the storage body is seated at the mounting surface.

19. The system of claim 18, further comprising a fastener extending upwardly through the mounting surface and into the first end of the storage body, wherein the fastener does not extend through the second end of the storage body.

20. The system of claim 17, wherein the storage body defines a spool drum.

* * * * *